United States Patent
Gupta et al.

(10) Patent No.: US 6,689,329 B2
(45) Date of Patent: Feb. 10, 2004

(54) FOULING TOLERANT FIXED BED REACTOR WITH VIRTUAL SECOND BED

(75) Inventors: Ramesh Gupta, Berkeley Heights, NJ (US); Salvatore Joseph Rossetti, Bernardsville, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

(21) Appl. No.: 09/974,561

(22) Filed: Oct. 10, 2001

(65) Prior Publication Data

US 2002/0081249 A1 Jun. 27, 2002

Related U.S. Application Data

(63) Continuation-in-part of application No. 09/351,648, filed on Jul. 13, 1999.

(51) Int. Cl.[7] .................. B01J 8/04; B01J 8/02
(52) U.S. Cl. .............. 422/191; 422/193; 422/195; 422/211; 422/217; 422/220
(58) Field of Search ................. 422/217, 220, 422/191, 194, 195, 216, 192, 193, 176, 177

(56) References Cited

U.S. PATENT DOCUMENTS

| | | | |
|---|---|---|---|
| 3,006,740 A | * 10/1961 | Maggio | 422/217 |
| 3,146,189 A | 8/1964 | Kunreuther et al. | 208/146 |
| 3,431,084 A | 3/1969 | Forbes | 422/217 |
| 3,469,950 A | 9/1969 | Mackley | 422/220 |
| 3,509,043 A | 4/1970 | McMaster et al. | 208/213 |
| 3,524,731 A | 8/1970 | Effron et al. | 422/220 |
| 3,607,000 A | 9/1971 | Beal et al. | 423/659 |
| 3,702,238 A | 11/1972 | Armistead et al. | 422/195 |
| 3,888,633 A | 6/1975 | Grosboll et al. | 422/217 |
| 3,992,282 A | 11/1976 | Grosboll et al. | 208/46 |
| 4,313,908 A | 2/1982 | Gupta | 422/111 |
| 4,330,505 A | 5/1982 | Gupta | 422/217 |
| 4,380,529 A | 4/1983 | Gupta | 422/220 |
| 4,385,033 A | 5/1983 | Gupta | 422/217 |
| 4,904,456 A | 2/1990 | Anderson | 422/220 |
| 5,160,513 A | 11/1992 | Koves | 95/90 |
| 5,670,116 A | 9/1997 | Gupta et al. | 422/191 |

* cited by examiner

*Primary Examiner*—Hien Tran
(74) *Attorney, Agent, or Firm*—Malcolm D. Keen

(57) ABSTRACT

The invention is directed to a bypass device for extending the operating life of fixed bed reactors. The device may be placed within a fixed catalyst bed to partition the bed into a first top bed and a second virtual bed. The bypass device allows any fluid feedstock to bypass the first top bed of the fixed catalyst bed as it fouls and enter the second virtual bed under conditions that promote depositing any foulants contained in the bypass flow on the top surface of the second virtual bed rather than in the interstices of the second virtual bed. The invention also relates to an improved fixed bed reactor comprising the inventive bypass device and a method for extending the operating life of a fixed bed reactor that employs the inventive bypass device.

9 Claims, 5 Drawing Sheets

FOULING TOLERANT FIXED BED REACTOR WITH VIRTUAL SECOND BED

REFERENCE TO COPENDING APPLICATION

The present application is a continuation-in-part of U.S. application Ser. No. 09/351,648 filed Jul. 13, 1999, entitled fouling tolerant fixed bed reactor. This application claims priority from U.S. Provisional Application Ser. No. 60/299,502. filed Jun. 21, 2001.

FIELD OF THE INVENTION

The present invention relates generally to methods and devices for extending the operating life of fixed bed reactors. More specifically, the present invention relates to a bypass device that partitions a single fixed bed of a fixed bed reactor into a first top bed and a second virtual bed. The bypass device further bypasses a reactor feedstock around the first top bed as the first top bed fouls and distributes the bypassed feedstock flow to the top surface of the second virtual bed. The fixed bed reactor may have one or more than one fixed beds. The invention also relates to fixed bed reactors that use the inventive bypass device and to methods for extending the operating life of fixed bed reactors.

BACKGROUND OF THE INVENTION

In the operation of fixed bed reactors, the top of the fixed bed often becomes fouled or plugged by the deposition of fouling materials (also referred to as particulates, particulate impurities, or foulants) contained in the fluid feedstocks flowing into the fixed bed. Examples of fouling materials include organometallic compounds, polymeric materials, carbonaceous materials, organic particulates and inorganic particulates. The plugging of the fixed bed results in increased pressure drop that may necessitate shutdowns, throughput reduction, and time consuming repairs and maintenance.

To overcome this problem, many methods have been devised that require equipping each reactor with more than one fixed bed and bypassing a fouled fixed bed. Examples of such methods are described in U.S. Pat. Nos. 3,509,043 and 4,313,908. One shortcoming of such methods is that they require an auxiliary bypassable fixed bed. Thus, the above methods do not readily apply to single fixed bed reactors.

Other methods involve the use of trash baskets. For example, U.S. Pat. Nos. 3,992,282 and 3,888,633, describe a fixed catalyst bed reactor having a hollow trash basket made from a screen mesh material that extends into the fixed catalyst bed. Particulate impurities are removed from a fluid stream flowing into the fixed catalyst bed by the hollow trash basket.

While the trash baskets remove some fouling materials contained in the fluid feedstocks, they generally have only a small effect in minimizing pressure drop buildup due to fouling. This is partially because fouling materials plug the trash basket walls within a short period of time. Thus, the flow passage of the fluid feedstocks is occluded and the pressure drop begins to rise, though at a somewhat slower rate than if the trash baskets were not used. Generally, it is desirable to keep fixed bed reactors on stream without significant pressure drop buildup for a long time, very often for several years. Thus, the methods involving trash baskets do not provide adequate protection against pressure drop buildup, and other methods are needed to further extend the operating life of fixed bed reactors. Other problems are associated with existing methods for extending the operating life of fixed bed reactors.

SUMMARY OF THE INVENTION

One aspect of the present invention relates to a reactor for treating a feedstock flowing therethrough. The reactor comprises at least one fixed bed for treating the feedstock and at least one bypass device. The bypass device comprises a cage positioned within the fixed bed. The cage has a top wall, side walls and a substantially open or wholly open bottom end. The cage partitions the fixed bed into a first top bed and a second virtual bed. The bypass device also comprises a bypass tube that is in fluid communication with the cage. The bypass tube protrudes from the cage above the top surface of the fixed bed for bypassing an increasing amount of the feedstock around the first top bed as it fouls. The bypass flow is directed through the bypass tube into the cage and out from the cage through its open bottom end on the top surface of the second virtual bed.

Another aspect of the present invention relates to a method for extending the operating life of a fixed bed reactor. The method comprises providing a fixed bed having at least one fixed bed, partitioning the fixed bed into a first top bed and a second virtual bed, introducing a feedstock into the fixed bed, and bypassing an increasing amount of the feedstock to the second virtual bed as the first top bed fouls. The present invention bypass device promotes the deposition of any foulants contained in the bypass flow on the top surface of the second virtual bed rather than into the interstices of the second virtual bed.

Yet another aspect of the present invention relates to a bypass device suitable for use in connection with a fixed bed reactor. The bypass device may include a substantially open or wholly open bottom end to maximize the top surface area of the second virtual bed where any bypassed foulants can deposit.

It has been unexpectedly discovered that the use of one or more of the inventive bypass devices on fixed bed reactors reduces significantly the pressure drop buildup of the fixed bed reactors. Methods, and systems that employ bypass devices having cages with fully open bottom ends are preferred, however, mechanical or other reactor specific constraints may prevent the bottom end of a cage to be fully open. Also, wire meshes or grids that are nearly fully or substantially open to the flow may also be used at the bottom of the cage as long as they do not obstruct the top surface area of the virtual bed to any significant extent.

A single larger cage or several smaller cages may be used to create a second virtual bed and maximize the top surface area of this virtual bed. Also, some of the cages may have multiple bypass tubes or no tubes at all. Many other variations or embodiments of the present invention, may be used to create a second virtual bed and maximize its top surface area that is available for foulant deposition. These and other embodiments of the present invention will become better understood with reference to the following detailed description considered in conjunction with the accompanying drawings described below.

DETAILED DESCRIPTION OF THE INVENTION

An embodiment of the present invention finds particular applicability in increasing the cycle life (or operating life) of fixed catalyst bed reactors such as hydroprocessing (or hydrotreating) reactors. Hydroprocessing reactors may process hydrocarbons by carrying out any one of a multitude of reactions. The invention is not limited to fixed catalyst bed reactors, but it can also be applied to any fixed bed reactors, or other fixed bed equipment such as contactors and filters.

For example, fixed catalyst bed reactors may be used for the conversion or treatment of hydrocarbon or chemical feedstocks in the presence of a vapor phase, such as hydrogen containing treat gas. More specific examples of reactors that can be used with the present invention include reactors used for hydroconversion of heavy petroleum feedstocks to lower boiling point products, the hydrocracking of distillate boiling range feedstocks, and hydrotreating of various petroleum feedstocks, such as light hydrocarbons, naphtha and distillate boiling range streams. This invention is applicable to reactors having one or more catalyst beds, however, it is particularly useful for reactors having only one fixed catalyst bed, because it allows bypassing a fouled catalyst layer within a single fixed catalyst bed.

For example, the inventive bypass device can be particularly beneficial in preventing the fouling of a fixed catalyst bed used for contacting a stream of hydrocarbon feedstock with a conventional reforming or hydroprocessing catalyst. One embodiment of the bypass device allows the feedstock to bypass the upper portion or top layer of the catalyst bed once fouling occurs, enabling bed operation for substantially longer periods of time as compared to running without the bypass apparatus. Existing or new reactors can be equipped readily with one or more bypass devices to enable them to run for longer periods of time.

Figure 1:
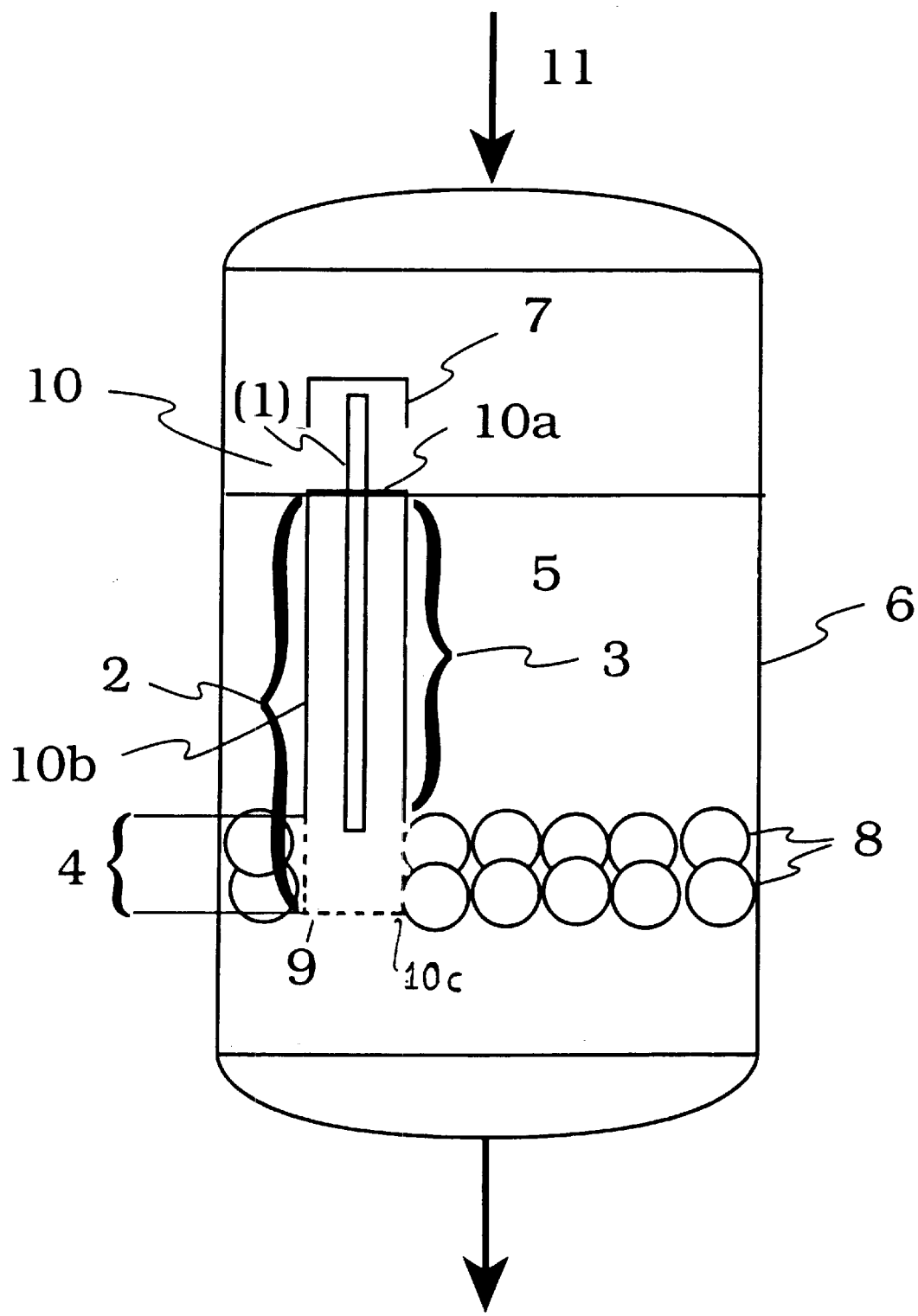
FIG. 1 shows a fouling tolerant fixed catalyst bed reactor having a single layer bypass device, according to one embodiment of the invention.
Figure 2:
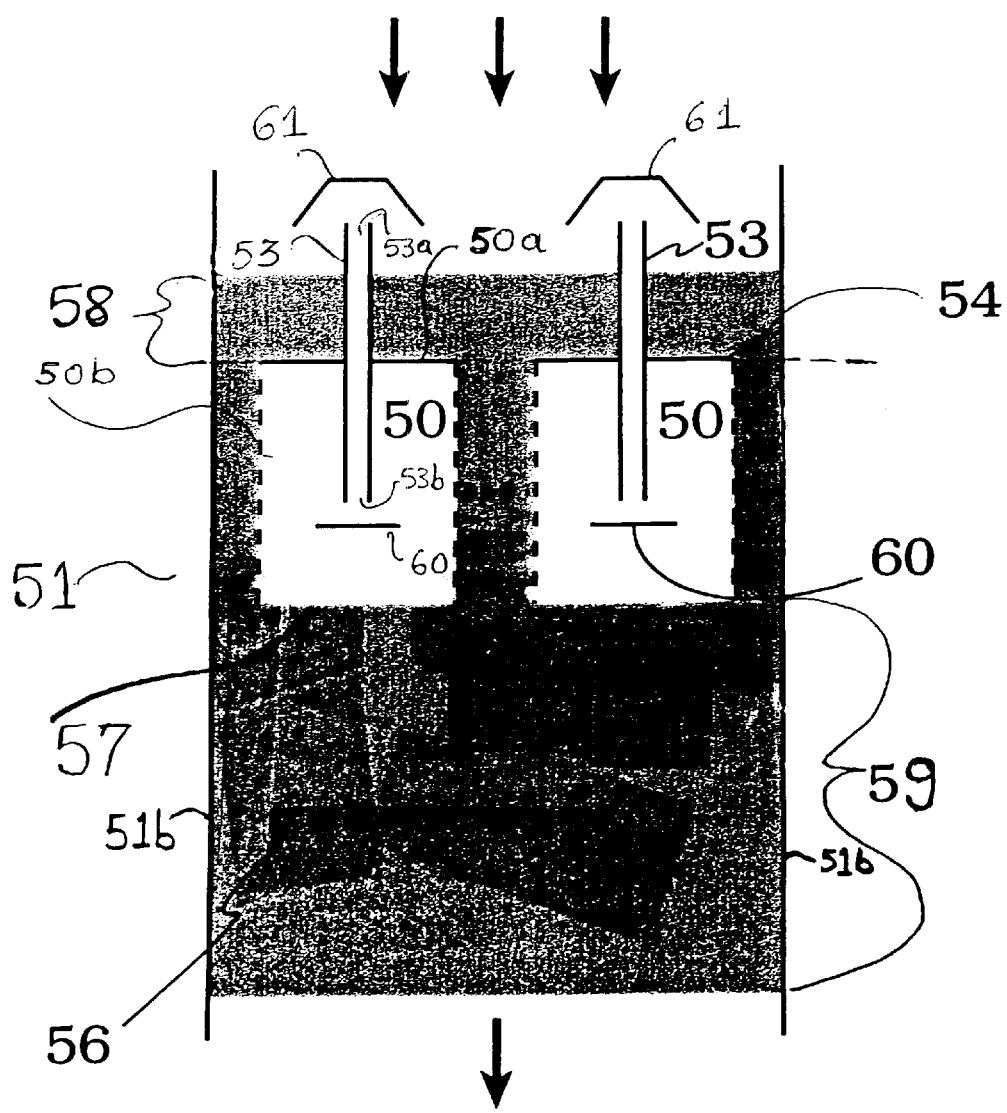
FIG. 2 shows a fouling tolerant fixed catalyst bed reactor having a plurality of bottomless bypass devices, according to another embodiment of the invention.
Figure 3:
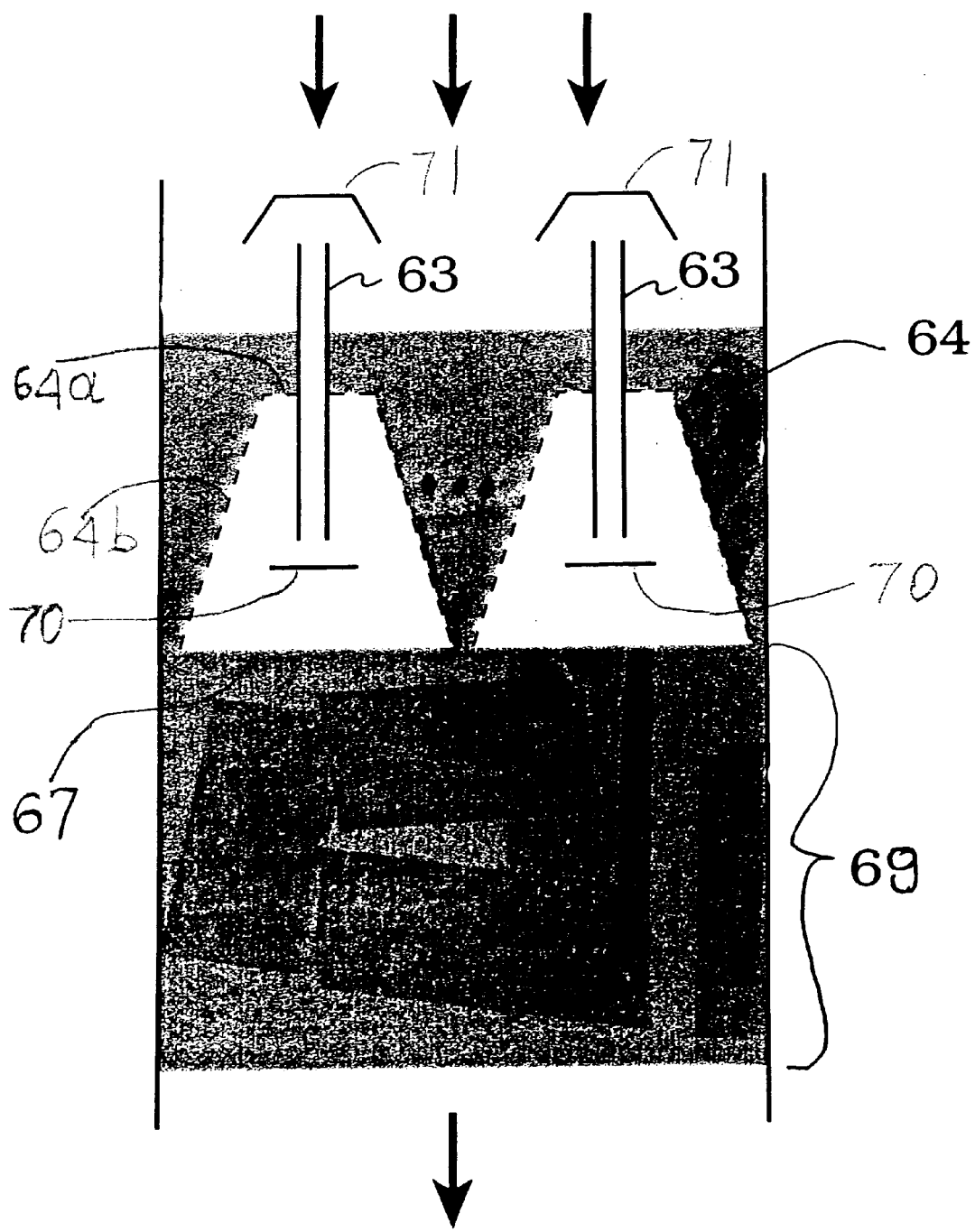
FIG. 3 shows a fouling tolerant fixed catalyst bed reactor having a plurality of bottomless bypass devices, according to another embodiment of the invention.
Figure 4:
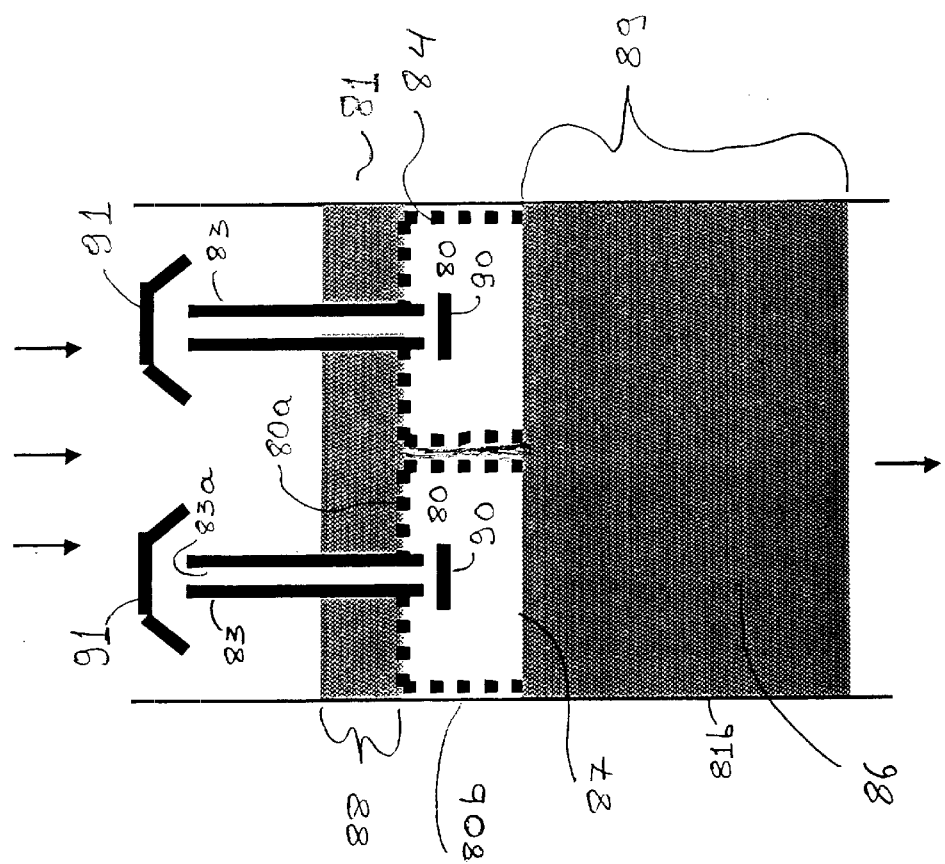
FIG. 4 shows a fouling tolerant fixed catalyst bed reactor having two bottomless bypass devices, according to yet another embodiment of the invention.
Figure 5:
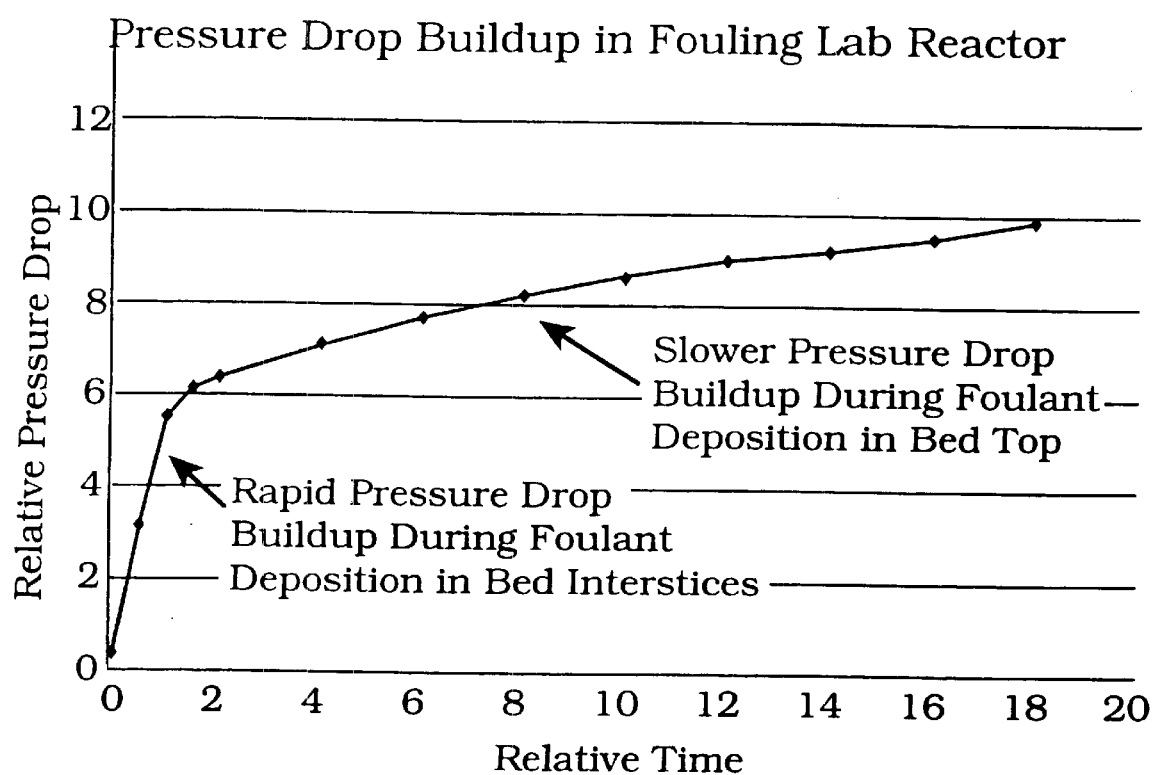
FIG. 5 shows pressure drop buildup data obtained in a laboratory scale reactor.

One embodiment of the present invention provides a bypass device for bypassing a single layer of a catalyst bed when that layer fouls, the bypass device (also referred to as "single layer bypass") comprising: a first elongated hollow member or cage having a plurality of perforations or openings and a second elongated hollow member (also referred to as a "bypass tube") generally disposed within the cage and protruding above the top of the cage. The cage can be partially or fully embedded in the bed such that the section of the cage having openings therein may discharge and distribute the bypassed hydrocarbon feed to an elevation within the bed below a top fouling layer of the bed. The cage may be closed at the top except for where the first hollow elongated member extends therethrough. However, depending upon the application, the entire cage member may have openings therein, including in the top wall, side walls, and bottom wall. Preferably, the cage may have a substantially open bottom end or a fully open bottom end. For example, FIG. 1 shows a cage having a top wall, side walls and a bottom wall with openings in the bottom wall and the lower portion of the side walls. FIGS. 2, 3, and 4 show bottomless bypass devices having no bottom wall.

Positioning of the bypass device within the fixed catalyst bed may vary. Preferably, however, the top wall of the cage may be positioned sufficiently lower than the top surface of the catalyst bed and may also be perforated in order to allow full utilization of the top catalyst layer for foulant deposition.

The bypass tube is in fluid communication with the perforated cage and extends above the top of the perforated cage. The bypass device may be positioned within the fixed catalyst bed so that the top of the bypass tube extends above the top surface of the fixed catalyst bed. As the top layer of the catalyst bed fouls because of impurities in the feedstock, and thus loses its permeability to flow, an increasing amount of feedstock bypasses the top layer through the bypass tube into the cage and exits from the cage through the cage perforations and/or an open bottom end of the cage to a lower unfouled or less fouled layer of the catalyst bed.

A bypass tube provides a pressure drop or flow resistance that is sufficiently higher than the pressure drop across a clean top layer of the bed but lower than the pressure drop across a fouled bed, and preferably a top fouled layer of the bed. Thus, the feedstock may generally go through the bypass tube only when a top layer of the bed fouls. When the top layer is not fouled the feedstock may flow through the bed without any significant bypass flow.

More than one bypass tubes may be used per each cage (not shown). For example, in one embodiment, a single bypass bottomless device may be used having a plurality of bypass tubes disposed within a single large cage. The cage may preferably cover substantially the whole area of the fixed bed from one side wall of the reactor to the other.

In yet another embodiment of the invention the cage may include a top wall, side walls, and an open bottom end as shown in FIGS. 2, 3, and 4. Preferably, the cage may have perforations on the top and side walls. The bypass tube may protrude through the top wall of the cage with an upper open end terminating above the top wall of the cage and a lower open end terminating within the cage. The bypass tube provides an effective overall pressure drop to minimize bypassing when the top catalyst layer of the catalyst bed is not fouled and divert the feedstock flow to bypass the top layer of the catalyst bed and enter the cage when the top layer is fouled.

Preferably, one or more bottomless bypass devices may be placed in a single fixed bed to effectively separate the bed into a first top bed (or top bed) and a second lower bed (also referred to as the second virtual bed). The first top bed is generally the portion of the bed that is above the top walls of the bottomless bypass devices. The second virtual bed is generally the portion of the bed that is below the bypass devices, more specifically the portion of the bed below the open bottom ends of the bottomless bypass devices. The portion of the catalyst bed between the side walls of two consecutive bypass devices and between the bypass devices and the walls of the reactor may also be available for foulant deposition, however it is preferred to minimize this area. The cage may also include a deflector plate generally located near the lower open end of the bypass tube. The deflector plate reduces the exit velocity of the bypass flow and better distributes the bypass flow to the top surface of the virtual second bed. The geometry of the bottomless cage and the bypass tube may vary.

Referring now to FIG. 1, there is illustrated a fouling tolerant reactor 6 having a fixed catalyst bed 5 and a single layer bypass device or apparatus 10 embedded in the catalyst bed 5, according to one embodiment of the invention. Shown is one bypass device, however, the invention may comprise a plurality of bypass devices spaced over the catalyst bed. Each bypass device 10 may extend into the catalyst bed to different bed depths.

The bypass device 10 comprises an elongated hollow member 2 (also referred to as a cage member or cage) having a top wall 10a, side walls 10b, a bottom wall 10c, and a plurality of perforations 9 disposed generally near a lower end or section or portion 4 of the cage 2. However, positioning of the perforations may vary. For example, all cage may have perforations. The bypass device 10 further comprises another elongated hollow member 1 (also referred to as bypass tube) disposed within cage 2 and protruding from the top wall 10a of cage 2 above the catalyst bed 5. The bypass tube 1 extends above the catalyst bed 5. The cage 2 has an upper enclosed portion (top wall and upper portion of the side walls) 3 and a lower perforated portion (bottom wall and lower portion of side walls) 4. Optionally, the bypass tube 1 may have a cap 7 over its top end or portion that extends above the catalyst bed 5. An optional layer of inert material 8 may be disposed within the catalyst bed 5 around the perforated section 4 of the cage 2.

The elongated hollow members 1 and 2 may be tubular members with the elongated hollow member 1 positioned or disposed within the elongated hollow member 2 in a concentric configuration as shown in FIG. 1. However, it should be understood that the elongated hollow members 1 and 2 can have other geometric shapes and relative configurations. Preferably, however, the cage member (cage) 2 may have a substantially larger cross section than the bypass member 1 (bypass tube). Also preferably, the cage may have an open end, or bottom as shown in the embodiment of FIGS. 2 and 3.

In operation, the bypass tube 1 may receive a portion of the feedstock and direct it into cage 2 where it is discharged through the perforations 9 of the cage 2 into a lower layer of the catalyst bed 5 that is not fouled. The top wall of the bypass device in FIG. 1 is flush with the top surface of the bed. However, positioning of the bypass device inside the bed may vary. Preferably, the bypass apparatus 10 may be inserted into the catalyst bed 5 such that cage 2 is buried into the bed. However, the positioning and dimensions of the bypass device may vary. For example, the bypass may be buried within the catalyst bed such that the bottom of the cage is contained within the catalyst bed and the bypass flow is distributed to a layer of the bed located beneath a top layer of the bed where substantial fouling occurs. Typically, fixed catalyst bed reactors that can benefit from the deployment of the inventive bypass devices include hydroprocessing and reforming reactors used in petroleum refining. However, any fixed bed using a packing of solids for contacting, filtering or reacting a feed may benefit from using the present invention bypass devices. For typical, commercial scale hydroprocessing and reforming reactors the top layer may extend from about a few inches up to about 5 feet (150 cm) from the bed's top surface. Thus, the bypass device may be designed to bypass the flow to a catalyst layer underneath the top fouling layer.

In the embodiment shown in FIG. 1, the second elongated member extends through the first hollow elongated cage and terminates substantially at the portion of the cage having perforations therein. However, other configurations are within the scope of the invention. For example, the second elongated member may stop short of the perforations, or extend to an area within the portion of the cage having perforations. The bottom of the cage may be enclosed and only the side walls may have perforations in the lower portion of the cage. In one embodiment, the cage is fully buried in a catalyst bed below the surface of the bed, and the entire cage length has openings therein. In a catalyst bed where only a top layer becomes fouled, bypassed feedstock may be directed just below the fouled top layer.

The cage perforations 9 may be made by a variety of methods including constructing a portion of the cage from a mesh type material. The area of the cage having openings therein may vary. For example, only the side walls may have perforations, or other areas of the cage such as the top and bottom walls may likewise have perforations therein. Alternatively, all walls of the cage may be perforated. Also, the size of the cage perforations may vary. For example, in one embodiment of the invention the perforations may be sufficiently large to allow any small quantity of the particulates that are entrained in the bypassed flow to exit the cage and get distributed into the bed. Alternatively, the cage perforations 9 may be sufficiently small so that any bypassed foulant particulates will be retained within the cage. Preferably, however, the cage perforations are sized to retain larger size particulates and allow smaller size particulates to exit the cage. Generally bypass foulant particulates are small particles contained in the hydrocarbon feed that are bypassed through the bypass tube and which contribute to fouling of the catalyst bed. Typically, the cage openings may range in size of from about $\frac{1}{8}$ inches (0.31 cm) to about $\frac{1}{2}$ inches (1.25 cm) wide holes or slits. The area around the cage openings may be packed with solids that are bigger in size than the catalyst particles to prevent migration of the catalyst particles into the cage through the perforations.

The tube in cage design of the present invention (tube-cage bypass) offers many advantages over prior art bypass devices. For example, the "tube-cage" bypass maintains the integrity of the catalyst particles because it allows for generally lower exit velocities of the bypassed flow into the catalyst bed. High exit velocities would generally erode the bed or cause it to slump, increase its pressure drop, and deteriorate the overall reactor performance. Other advantages exist.

The reactor 6 may be operated by introducing a feedstock 11, such as hydrocarbons, to be reacted in the catalyst bed 5 along with any suitable treat gas and chemical, as needed, such as hydrogen. The feedstock 11 can be a liquid, gas, or a mixture thereof. The reactor 6 may be operated at any suitable process conditions. Such conditions are known in the art and are generally not modified by use of the inventive bypass apparatus. The feedstock 11 may undergo any desired chemical reactions as it moves through the catalyst bed. At the beginning, when the catalyst bed 5 is clean and no foulants or only a few foulants have been deposited at the bed top, a majority of the flow may go through the catalyst bed 5 instead of the bypass apparatus 10. This is because the bypass tube 1 is sized to have a higher pressure drop relative to the clean bed, and thus the flow takes the path of least resistance through the unfouled catalyst bed 5. Generally the bypass tube 1 may be sized to provide a pressure drop of from about 2 to about 100 times, preferably of from about 5 to about 80 times, and more preferably of from about 10 to about 50 times the pressure drop of the fouling top layer prior to fouling. During operation, as the bed top fouls the resistance to flow through the bed increases causing an increasing fraction of the flow to bypass the top of the bed through the bypass apparatus 10.

For example, the pressure drop through a clean, (unfouled) top four feet layer of a catalyst bed may typically be 2 psi in a typical commercial scale, hydroprocessing reactor. For such a reactor, depending upon the operation, the bypass tubes 1 may be sized to have a flow resistance of about 5 to about 200 psi, preferably from about 10 to 160 psi, and more preferably from about 20 to about 100 psi, with total feedstock flow in the tubes 1. By employing one or more bypass devices, the pressure drop through the top four feet section of the bed may generally not exceed about 50 psi for an extended period of time. If the inventive bypass devices 10 are not used, the pressure drop can be significantly higher than 50 psi upon fouling which may necessitate a reactor shutdown or throughput reduction.

The inventive bypass apparatus may be constructed from any material compatible with the operating conditions of the reactor. For example, suitable materials may include metals such as carbon steel and stainless steel, ceramic materials, and other composite materials such as carbon fiber reinforced materials.

The bypass tube 1, through which the feedstock is bypassed, may be of any diameter or width depending upon the amount and rate of bypass flow to the unfouled layer of the catalyst bed and the desired pressure drop. Such diameters may easily be determined by the skilled artisan. For example, typically, the diameter of the bypass tube 1 may range from about 0.25 inches (0.625 cm) to about 12 inches (30 cm), more preferably from about 0.5 inches (1.25 cm) to about 6 inches (15 cm), and most preferably from about 0.5 inches (1.25 cm) to about 3 inches (7.5 cm). The cage 2, likewise, may be of any diameter, but is generally of a substantially greater diameter or cross-section than the bypass tube 1, in order to allow for sufficiently low exit velocities of the bypassed flow into the bed. For example, the cage diameter may range from about 3 inches (7.5 cm) to about 20 inches (50 cm), more preferably from about 4 inches (10 cm) to about 12 inches (30 cm), and most preferably from about 4 inches to about 10 inches.

One or more bypass devices may be utilized. The number of bypass devices utilized generally may depend upon the size of the reactor and the flow rate of the feedstock in the reactor. The design and number of the bypass devices is such that the bypass devices may offer higher resistance to flow than the clean beds, and less flow resistance than a fouled bed. When determining the number and location of the bypass devices, the skilled artisan may take into consideration, inter alia, localized velocities, residence times, and temperature distribution. The number and location of the bypass devices for a given reactor may be chosen to maintain the overall performance of the unit.

Section 4 of the cage 2 distributes the bypassed feedstock into the catalyst beds. The area surrounding the cage perforations 9 may include a layer of packing material 8 having a size that assists in the distribution of the bypassed feedstock through the catalyst bed. Use of packing material is optional. The packing material 8 may allow any particulates flowing into the bypass apparatus 10 to be dispersed upon exiting the cage perforations 9. Suitable packing material 8 may be any inert material such as alumina balls typically used to support catalyst particles in a fixed bed. The packing material 8 could also be any other material or even catalyst particles, provided that the catalyst particles are of greater size than the perforations 9. Thus, catalyst particles, if chosen as a packing material 8, may preferably be of an appropriate size to distribute the feedstock being bypassed. Typically, the particles may range in size from about 0.25 inches (0.625 cm), to about 4 inches (10 cm). In addition to alumina balls, several other packing materials such as those typically used in packed towers may also be used.

In a preferred embodiment of the invention, the bypass tube 1 may have a device or cap 7 at the top to facilitate separation of particulates from the bypassed hydrocarbon feed, as shown in FIG. 1. The downward moving hydrocarbon feed from the reactor inlet is forced to change its direction by the cap 7 so that the feed can move upward and then enter the bypass apparatus 10. While the flow direction of the feed is changed by the cap 7, the inertia of the particulates prevent these particulates from changing their flow direction. These particulates separate out and accumulate at the bed top. Thus, the cap 7 may remove a significant number of particulates, and minimize fouling in the interior bed sections. The separation cap 7 (or separator) may generally remove the larger size particulates. Depending upon the sizes of the incoming particulates, some of the very small particulates may not get separated by the separation cap 7. Often, these particulates may be so small in size that they may pass through the catalyst bed 5 without plugging it. Inert packing 8 that surrounds the cage perforations 9 may help disperse these small size particulates in the layer of the inert material and further minimize pressure drop buildup. Other separation devices could also be used. Examples of suitable separation devices may include small centrifugal separators or cyclones mounted on the top of each bypass tube 1.

In one embodiment of the invention shown in FIG. 2, a fixed bed reactor 51 is provided comprising a fixed bed 56 and a plurality of bottomless bypass devices 50. Each bypass device 50 comprises a bypass tube 53 disposed within a bottomless cage 54. The bottomless cage 54 has a top wall 50a, and side walls 50b, but no bottom wall, that is the cage 54 has an open bottom end 57. The side walls 50b of the bottomless cage 54 have perforations for discharging at least some of the bypass flow in the area of the bed that is between two consecutive bypass devices 50, and between the bypass devices 50 and the side walls 51b of the reactor 51. Preferably, a plurality of bottomless bypass devices 50 may be embedded in a single catalyst bed 56 to create a virtual second bed 59 within the single catalyst bed 56. A first top bed 58 is generally defined by the catalyst bed that is above the top walls 50a of the bypass devices 50, while a second virtual bed 59 is created below the open bottom end 57 of the bypass devices 50. The area of the catalyst bed between the bypass devices and between the bypass devices and the walls 51b of the reactor 51 is also generally available for foulant deposition. However it is preferred to minimize this area so that the bypass flow exits the cages 54 through their open bottom ends 57. A deflector plate 60 is preferably located at the vicinity of the lower open end 53b of the bypass tube 53 to reduce the exit velocity of the bypass flow and better distribute it to the top surface of the virtual second bed 59. This configuration promotes deposition of any foulants contained in the bypass flow on the top surface of the second virtual bed 59 rather than into the interstices of the second virtual bed 59. Optionally, a cap 61 may be placed over the top end 53a of the bypass tube 53 as in the embodiment of FIG. 1.

The geometry of the bottomless cages 54 may vary. For example, the cage may be a cone frustum, a pyramid frustum or a cylinder. One alternative design is shown in FIG. 3 whereas each bottomless cage 64 has the shape of an inverted conical cup in communication with bypass tube 63. This design maximizes the surface area of the open bottom end 67 of the cage 64 and thus the top surface area of the second virtual bed 69 that is available for foulant deposition. Preferably, the cage 64 has perforated top and side walls, 64a and 64b respectively. The amount, size and positioning of the perforations may vary. The embodiments of FIGS. 2, 3, and 4 provide a virtual second bed within a single fixed bed for the foulants to deposit. Any foulants contained in the bypass flow may deposit at the top surface of the second virtual bed instead of depositing in the bed interstices. Deflector plates 70 and caps 71 may also be used as in the embodiment shown in FIGS. 2, 3, and 4.

FIG. 4 shows yet another embodiment of the present invention comprising a reactor 81 comprising a fixed bed 86 and two bottomless bypass devices 80. Each bypass device 80 comprises a bypass tube 83 with inlet 83a (one designated) securely positioned within a bottomless cage 84. The bottomless cage 84 has a top wall 80a, side walls 80b, and a wholly open bottom end 87. The side walls 80b and the top wall are perforated. The cages 84 cover substantially the whole area of the fixed bed leaving very little space between the cages and between each cage and the side walls 81b of the reactor 81 so as to partition fixed bed 86 into a top bed 88 and a virtual second bed 89. Thus, substantially all of the bypass flow exits the cages 84 through their open bottom ends 87. The bypass devices 80 also include a deflector plate 90 and a cap 91 as in the embodiment of FIGS. 1 2, and 3.

It has been unexpectedly discovered that lower pressure buildup occurs with a bottomless cage bypass device. Without wishing to limit the invention in anyway it is theorized that the bottomless cage promotes foulant deposition on the surface of the bed rather than in the interstitial space in between the catalyst particles. FIG. 4, shows pressure drop buildup data obtained in a laboratory fixed catalyst bed reactor. The reactor was made to foul by contaminating a gas feed with finely crushed walnut shells. The average particle size of the crushed walnut shells was about 250 micrometers, in order to simulate the typical size of foulants found in commercial feedstocks. The reactor did not contain any bypass devices. FIG. 4 shows that the pressure drop increases rapidly in the beginning as the foulant particles fill the interstices near the bed top. Later as the catalyst bed interstices near the bed top were filled up and the particles began to deposit above the bed, the rate of pressure drop build-up reduced dramatically.

Unlike the bypass device shown in FIG. 1, a bottomless bypass device has no bottom wall. Examples of bottomless bypass devices are shown in FIGS. 2 and 3. Employing a plurality of bottomless bypass devices allows the creation of a virtual second bed within a single bed reactor. The bottomless bypass devices allow depositing the foulants contained in the bypass flow to deposit above the top surface of the virtual bed rather than in the bed interstices. Generally, the pressure drop buildup obtained with a bottomless bypass device may be about an order of magnitude slower, and has a much longer reactor run length may be achieved.

The length of a bottomless bypass device may vary, however it should be less than the full length of the bed as shown in FIGS. 2 and 3. Preferably, the length of a bottomless bypass device may be from a few inches to about 5–8 feet.

Many modifications of the above exemplary embodiments will naturally occur to the skilled practitioner of this art without departing from the scope of the appended claims.

What is claimed is:

1. A reactor for treating a feedstock flowing therethrough, said reactor comprising,
at least one fixed bed for treating said feedstock; and
at least one bypass device
comprising (i) a hollow, empty cage positioned within said at least one fixed bed, said hollow, empty cage having a top wall, side walls and a substantially open bottom end, said cage partitioning said at least one fixed bed into a first top bed and a second virtual bed; and (ii) an open, tubular, bypass tube in fluid communication with said cage, said bypass tube protruding from said cage above said at least one fixed bed providing a pressure drop that is sufficiently higher than the pressure drop across the top bed to minimize bypassing of the top bed when the top bed is not fouled but lower than the pressure drop across a fouled top bed and which also provides an effective overall pressure drop to divert the feedstock flow through the open bypass tube to bypass the top bed and enter the second virtual bed through the hollow, empty cage when the top bed is fouled so as to bypass an increasing amount of said feedstock around said top bed as the top bed fouls through said bypass tube into said cage and out from said cage through said substantially open bottom end onto the top surface of said second virtual bed.

2. The reactor of claim 1, wherein said bypass device further comprises a deflector plate securely attached inside said cage and positioned near the exit of the bypass tube from said bypass tube to deflect the flow from the bypass tube and better distribute the flow from the bypass tube on the surface of the second virtual bed.

3. The reactor of claim 1, wherein said cage has a substantially rectangular cross section along its length dimension.

4. The reactor of claim 1, wherein said cage has a substantially inverted conical cup shape cross section along its length dimension.

5. The reactor of claim 1, wherein said cage is a cone frustum, a cylinder, or a pyramid frustum.

6. The reactor of claim 1, wherein said top and side walls of said cage are perforated.

7. The reactor of claim 1, further comprising a separator positioned above an upper open end of said bypass tube for removing solid particles from said feedstock.

8. The reactor of claim 7, wherein said separator is an inverted cup.

9. The reactor of claim 1, wherein said bypass tube has an upper open end and a lower open end and wherein said cage further comprises a deflector plate securely positioned within said cage near the lower end of said bypass tube.

* * * * *